US010180793B2

United States Patent
Nguyen et al.

(10) Patent No.: US 10,180,793 B2
(45) Date of Patent: Jan. 15, 2019

(54) PERFORMANCE ATTRIBUTES FOR MEMORY

(71) Applicant: Hewlett Packard Enterprise Development LP, Houston, TX (US)

(72) Inventors: Vincent Nguyen, Houston, TX (US); Thierry Fevrier, Gold River, CA (US); David Engler, Cypress, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 6 days.

(21) Appl. No.: 15/420,313

(22) Filed: Jan. 31, 2017

(65) Prior Publication Data

US 2018/0217750 A1   Aug. 2, 2018

(51) Int. Cl.
  *G06F 3/06*   (2006.01)
(52) U.S. Cl.
  CPC .............. *G06F 3/061* (2013.01); *G06F 3/065* (2013.01); *G06F 3/0625* (2013.01); *G06F 3/0631* (2013.01); *G06F 3/0685* (2013.01)
(58) Field of Classification Search
  CPC ....... G06F 3/061; G06F 3/0625; G06F 3/0631
  USPC ....................................................... 711/170
  See application file for complete search history.

(56) References Cited

U.S. PATENT DOCUMENTS

| 9,110,592 B2 | 8/2015 | Lee et al. | |
| 2002/0105523 A1* | 8/2002 | Behrbaum | G06F 12/0284 345/543 |
| 2014/0059319 A1 | 2/2014 | Noro et al. | |
| 2014/0059368 A1 | 2/2014 | Kumar et al. | |
| 2014/0223098 A1* | 8/2014 | Lee | G06F 9/5016 711/118 |
| 2014/0244960 A1 | 8/2014 | Ise et al. | |
| 2016/0140039 A1 | 5/2016 | Sodani et al. | |
| 2016/0179375 A1 | 6/2016 | Kirvan et al. | |
| 2017/0357580 A1* | 12/2017 | Sodani | G06F 12/0646 |

OTHER PUBLICATIONS

Goglin, B., "Exposing the Locality of Heterogeneous Memory Architectures to HPC Applications", 1st ACM International Symposium on Memory Systems (MEMSYS16), Oct. 2016, Washington, DC, United States, 13 pages.

* cited by examiner

*Primary Examiner* — Than Nguyen
(74) *Attorney, Agent, or Firm* — Hewlett Packard Enterprise Patent Department

(57) ABSTRACT

An example device in accordance with an aspect of the present disclosure includes a plurality of memory segments corresponding to at least one memory channel of a computing system that is to receive a memory module. A performance attribute of an Advanced Configuration and Power Interface (ACPI) table is set to indicate performance of at least one of the plurality of memory segments, and is usable for memory allocation by an operating system memory manager.

19 Claims, 5 Drawing Sheets

PERFORMANCE ATTRIBUTES FOR MEMORY

BACKGROUND

In computing systems, such as servers, the number of memory channels of central processing units (CPUs/processors) continues to increase. Populating the memory channels with balanced memory configurations, such as by using the same type of memory module (e.g., dual inline memory module (DIMM) to fully populate the memory channels), can reduce the likelihood of poor memory performance. However, fully populating the memory channels can result in unnecessarily exceeding application needs, while negatively affecting server power consumption and total system costs. Although a computing system can support imbalanced memory configurations (in terms of physical memory population, technologies, and capacities) to alleviate excessive power consumption and system costs, such imbalanced configurations introduce performance bottlenecks in memory subsystems and increased complexity in operating systems and applications, resulting in performance degradation.

BRIEF DESCRIPTION OF THE DRAWINGS/FIGURES

DETAILED DESCRIPTION

Computing systems can obtain, via attributes, some information about their installed memory configuration or memory sub-system design topology. However, attributes currently defined by the Advanced Configuration and Power Interface (ACPI) Hardware Specification Standard provide little information about installed memory configuration or memory sub-system design topology (such as the memory topology dictated by chassis mechanical form-factor constraints). Without such information, the computing system (e.g., an operating system (OS) memory manager) may randomly allocate memory into computing system regions having limited bandwidth, which can result in reduced performance (e.g., up to 20% performance degradation) for memory-intensive workloads, In addition, the OS memory manager has no guidance for utilizing memory regions efficiently for additional power saving opportunities.

To address such issues, examples described herein may provide attributes that can be utilized (e.g., by an OS memory manager) for enhanced memory allocation and to minimize system performance impact even for imbalanced memory configurations. In example implementations, such attributes can be presented through firmware, through an ACPI table, and the like. By using attributes to support such imbalanced physical memory topology configurations, example implementations can address drawbacks identified above, by enabling the computing system to optimize physical memory allocations and access patterns, among other optimizations. In this manner, examples described herein may enable flexibility for server configurations/pricing strategies, enabling right-sized memory configurations targeted for various workloads. An OS memory manager can use such example attributes to enhance the memory allocation process and to minimize system performance impacts associated with imbalanced memory configurations. Furthermore, the attributes can be used to consolidate system memory for better power efficiency using memory power domains, e.g., when the computing system is not running at full capacity.

Figure 1:
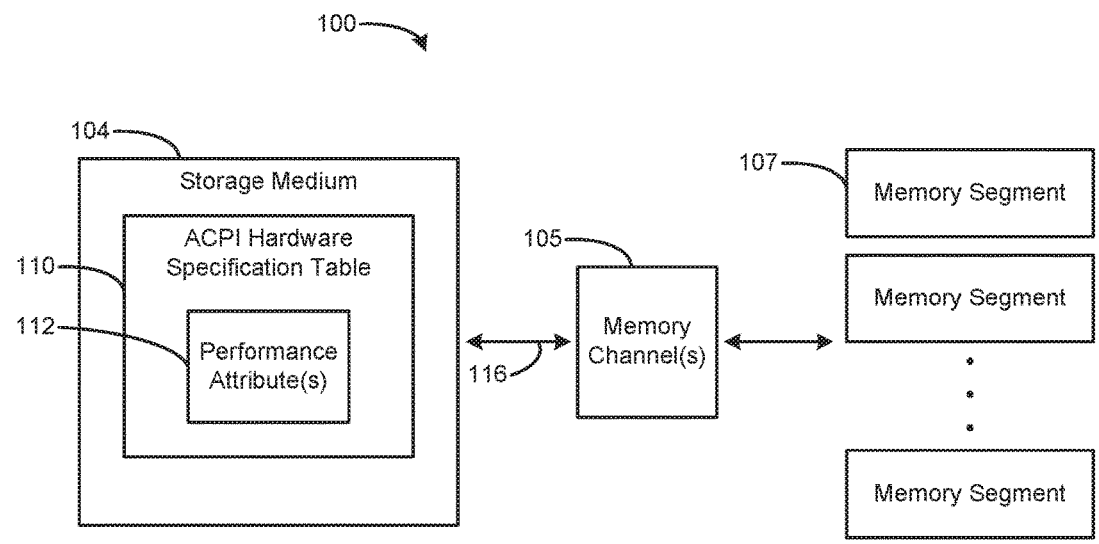
FIG. 1 is a block diagram of a computing system including at least one performance attribute according to an example.

FIG. 1 is a block diagram of a computing system 100 including at least one performance attribute 112 according to an example. The computing system 100 also includes a plurality of memory segments 107, corresponding to at least one memory module associated with at least one memory channel 105. A non-transitory machine-readable storage medium 104 is encoded with instructions executable by the computing system 100 that, when executed, cause the computing system to establish the performance attribute 112 as part of an Advanced Configuration and Power Interface (ACPI) Hardware Specification table (ACPI table) 110. The performance attribute 112 can be set to indicate the performance of at least one of the plurality of memory segments 107. The performance attribute 112 also is usable for memory allocation by an operating system memory manager (not shown in FIG. 1; see FIG. 3).

The ACPI specification generally enables a computing system to discover and configure hardware components, such as by performing status monitoring and putting unused components to sleep. Thus, the example implementations described herein can use the ACPI specification as a mechanism to enable a given computing system platform to communicate to an OS. However, other techniques can be used to communicate the information of the performance attributes 112, such as through the use of a platform intercept.

The performance attributes 112 are shown located in the ACPI table 110, which can be stored in computing system firmware. The firmware can take the performance attributes 112 and write them to a memory location readable by the computing system OS. Firmware instructions can be executed by a computing system at bootup, before an OS has been loaded, and can remain active after the OS has been loaded. Firmware instructions for example can be executed by basic input/output system (BIOS) of the computing system. Higher level instructions, such as System OS instructions, can be loaded in memory of the computing system upon bootup, and executed during normal operation of the computing system after bootup. Higher level instructions can rely on the OS to provide abstraction of various computing resources, such as access to virtual memory. In an example implementation, the computing system 100 can boot up under direction of the firmware, which discovers the computing system topology including what type of memory (e.g., DIMMs) and its configuration. Based on such information, the system firmware formulates the ACPI table 110 and makes such information available (e.g., to the OS), based on the framework including the example performance attributes 112. The non-transitory machine-readable storage medium 104 can be encoded as firmware instructions of the computing system 100.

The performance attributes 112 can be presented in terms of memory segmentation. A performance attribute 112 can specify that a given segmentation (memory segment 107) has a given size, a given bandwidth performance, a given power efficiency performance, or other type of performance.

The example implementations of the ACPI table 110 can be provided as an ACPI table that is updated to include the performance attributes 112, In alternate example implementations, the ACPI table 110 can be provided as a newly created table. The ACPI table 110 can be updated to reflect various use cases, such as hard adding or removing memory, which may likely result in different memory segmentation having different behavior than before, In contrast to existing ACPI attributes, such as system locality distance information table (SLIT) attributes, the example performance attributes 112 can provide information such as the memory interleaving scheme and the partition of the memory segmentation behind the memory controller, which enable optimization and allocation of memory to the appropriate application and thread. Furthermore, unlike the existing ACPI attributes, the example performance attributes 112 enable memory consolidation as well as sizes of different memory segmentation and different bandwidths. Accordingly, the performance attributes 112 enable additional features, e.g., enable an OS to assign the most frequent and largest dataset to a largest memory bank width, for enhanced performance, as well as enable the OS to consolidate memory contents into regions of power efficient memory, reducing power usage of the computing system without negative performance implications.

Performance attributes 112 indicate memory range and type, and are usable by the OS memory manager, or a hypervisor, or other component of the computing system 100 to optimize memory management (e.g., enabling better performance and power efficiency). The performance attributes 112 can be interpreted by ACPI components of the OS, such as by the OS loader and/or within the OS initialization, to be passed to the OS memory manager to customize memory handling based on the performance attributes 112.

The population of memory in the computing system 100 is flexible, e.g., additional memory channels 105 may be added, which results in the possibility of diverse memory segmentation. By using the performance attributes 112, the computing system 100 can allocate memory to enhance performance, thereby avoiding allocating memory to region(s) that would worsen system performance. The performance attributes 112 enable a more intelligent use of memory by, e.g., the OS memory manager, to allocate memory segments 107 to specifically optimize for a given workload, including power efficiency and performance optimizations.

In an example implementation, the performance attribute 112 indicates bandwidth performance, e.g., bandwidth performance associated with a physical configuration of a memory module(s) that is to populate the memory channel(s). In an example implementation, the performance attribute 112 is to indicate a power efficiency. The performance attribute 112 also can correspond to a memory subsystem design topology corresponding to a mechanical form factor of the computing system 100. Such performance attributes, relating to power efficiency and/or bandwidth performance, can be used by the OS memory manager to consolidate system memory for better power efficiency using memory power domains when the utilization of the computing system 100 can accommodate the memory consolidation (e.g., when not fully saturated by a workload). In an example implementation, degrees of power efficiency (e.g., high, medium, low, and so on) can be determined based on relative power efficiencies available in a given computing system. For example, a computing system can have a first memory channel associated with full power usage, and a second memory channel associated with half the power usage of the first memory channel. Accordingly, the first memory channel can be deemed low power efficiency, and the second memory channel can be deemed high power efficiency. Similarly, degrees of bandwidth performance can be relatively established for a given computing system.

Memory modules can interface with memory channels 105 of the computing system 100. The performance attributes 112 can specify portions of the memory at a granularity of memory address segmentation, i.e., one or more memory segments 107. Accordingly, the performance attributes can specify different segments even within a given memory module, such as a memory module that is configurable into different operational modes (e.g., volatile storage, non-volatile random access, etc.). Example implementations can define, based on the performance attributes 112, a physical memory pool assignable to virtual memory according to dynamic tuning and application physical memory needs. The memory channels 105 of example computing systems 100 can accommodate different types of memory, even simultaneously within the same computing system, including removable and on-die modules. The performance attributes 112 can be used to accommodate such different types of memory, including different segments within such memory types. Different types of memory/segments can imply different usage scenarios, for use by the OS. Even a single memory module can be defined as system memory, as block memory, as block storage, and/or as application memory. Accordingly, segmentation arises even if the memory is physically arranged symmetrically in the memory channels 105 (e.g., fully and/or evenly populated). Despite such issues, the performance attributes 112 inform the OS how best to make use of the different types of memory at a high degree of granularity, thereby enhancing performance and avoiding and need to make assumptions and suffer performance degradation. Similar to segmentation issues regarding memory types, segmentation can arise for different power efficiencies among memory, even in a mostly or fully populated system. Accordingly, the performance attributes also can be used to improve system power efficiency by intelligently utilizing memory segments that are power efficient, regardless of a given physical memory configuration, whether balanced or unbalanced, and whether partially, mostly, or fully populated.

The computing system 100 can use a notification 116 to indicate a change in the performance attribute(s) 112, such as to indicate a change in memory configuration of the computing system 100, In an example implementation, the notification 116 can be provided in the form of a basic input/output system (BIOS) notification attached to the ACPI table 110. The notification 116 informs the OS to reload the ACPI table(s) 110 to check for changes. In an example, memory contents can be reallocated into different memory regions/segments 107. The notification 116 also can be used to inform the computing system 100 of a power optimization for the memory allocation, based on intelligently monitoring workload usage for better results. The OS can then dynamically adjust the memory allocation approach based on the corresponding notification 116. In some example implementations, the notification 116 can take the form of an ACPI notification or use other existing notification structures, such as a BIOS notification attached to the ACPI table 110. In an example use case scenario, additional memory is added to the computing system 100 as its workload demands, and the computing system 100 (e.g., via firmware and/or BIOS) can issue the notification 116 for the OS to reload the corresponding new performance attributes 112 that were dynamically populated into the ACPI table 110 by the system.

The computing system 100 can be based on disaggregated memory. Accordingly, a pool of memory can be dynamically added without affecting the design of the computing system 100. Thus, the performance attributes 112 and the notifications 116 can apply to the topology of the memory within the computing system 100, as well as to a pool(s) of memory added external to the computing system 100. It is thus possible to keep track of the memory topology, with performance attributes 112 that change dynamically as new memory is added and/or as old memory is removed from the computing system 100.

A memory controller (e.g., to perform the functionality of a memory manager) is not shown in FIG. 1, and in some example implementations can be included within the computing system 100 (e.g., internal). In some alternate implementations, the memory controller can be provided external to the computing system 100, e.g., as a memory controller disaggregated from the computing system 100. The performance attribute(s) 112 are applicable regardless of the implementation of the memory controller.

Accordingly, the performance attributes 112 expose memory information to the OS, enabling the OS to make informed decisions on memory allocation and thereby improving computing system performance and memory manager robustness in bandwidth, power efficiency, and the like. The performance attributes 112 enable memory allocation approaches that minimize any performance implications of imbalanced memory configurations, and improve power efficiency during low workload demand periods. The performance attributes can be implemented in the ACPI table 110 to increase OS memory manager robustness. The chance of system performance degradation due to imbalanced memory configurations is minimized, and additional power savings are enjoyed while satisfying datacenter demands for flexibility in offering computing systems having imbalanced memory configuration at low cost, without performance trade-offs.

Figure 2:
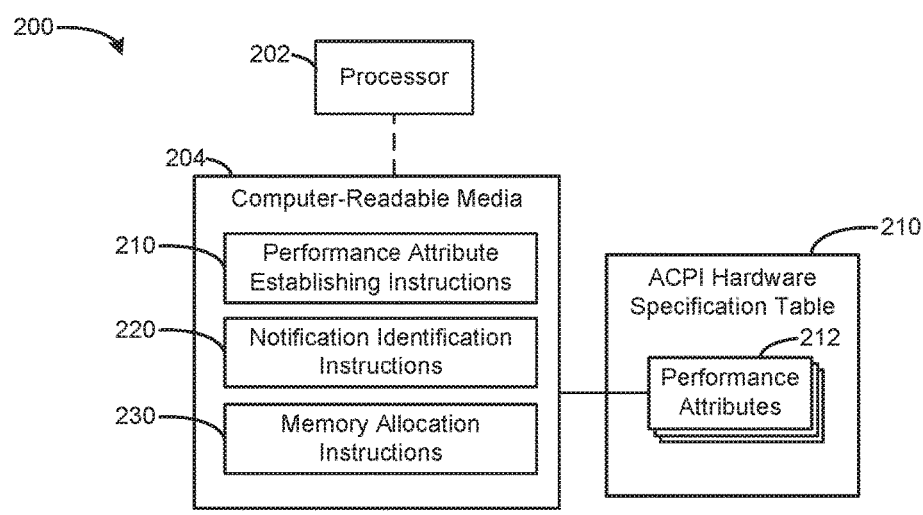
FIG. 2 is a block diagram of a computing system including performance attribute establishing instructions, notification identification instructions, and memory allocation instructions according to an example.

FIG. 2 is a block diagram of a computing system 200 including performance attribute establishing instructions 210, notification identification instructions 220, and memory allocation instructions 230 according to an example. The computing system 200 also includes a processor 202, coupled to the computer-readable media 204 on which instructions 210-230 are stored. The computing system 200 is to establish performance attributes 212, which may be stored in ACPI table 210.

Computer-readable media 204 may be accessible by the system 200, to serve as a computer-readable repository to store information such as performance attributes 212 that may be referenced by one or more engines corresponding to instructions 210, 220, 230. As described herein, the term "engine" may include electronic circuitry for implementing functionality consistent with disclosed example implementations, and may be included in the computing system 100 of FIG. 1. For example, engines can represent combinations of hardware devices (e.g., processor and/or memory) and programming (e.g., processor-executable instructions 210-230) to implement the functionality consistent with disclosed implementations. An example system (e.g., a computing device), such as computing system 100, may include and/or receive the tangible non-transitory computer-readable media storing the set of computer-readable instructions. As used herein, the processor/processing resource may include one or a plurality of processors, such as in a parallel processing system, to execute the processor-executable instructions. The memory can include memory addressable by the processor for execution of computer-readable instructions. The computer-readable media can include volatile and/or non-volatile memory such as a random access memory ("RAM"), magnetic memory such as a hard disk, floppy disk, and/or tape memory, a solid state drive ("SSD"), flash memory, phase change memory, and so on.

The performance attribute establishing instructions 210 are to establish a performance attribute of an ACPI table. The performance attribute corresponds to at least one of a plurality of memory segments of at least one memory channel of a computing system that is to receive a memory module.

The notification identification instructions 220 are to identify a notification indicating a change in status of the computing system.

The memory allocation instructions 230 are to, in response to the notification, allocate memory by an operating system memory manager according to the performance attribute.

Figure 3:
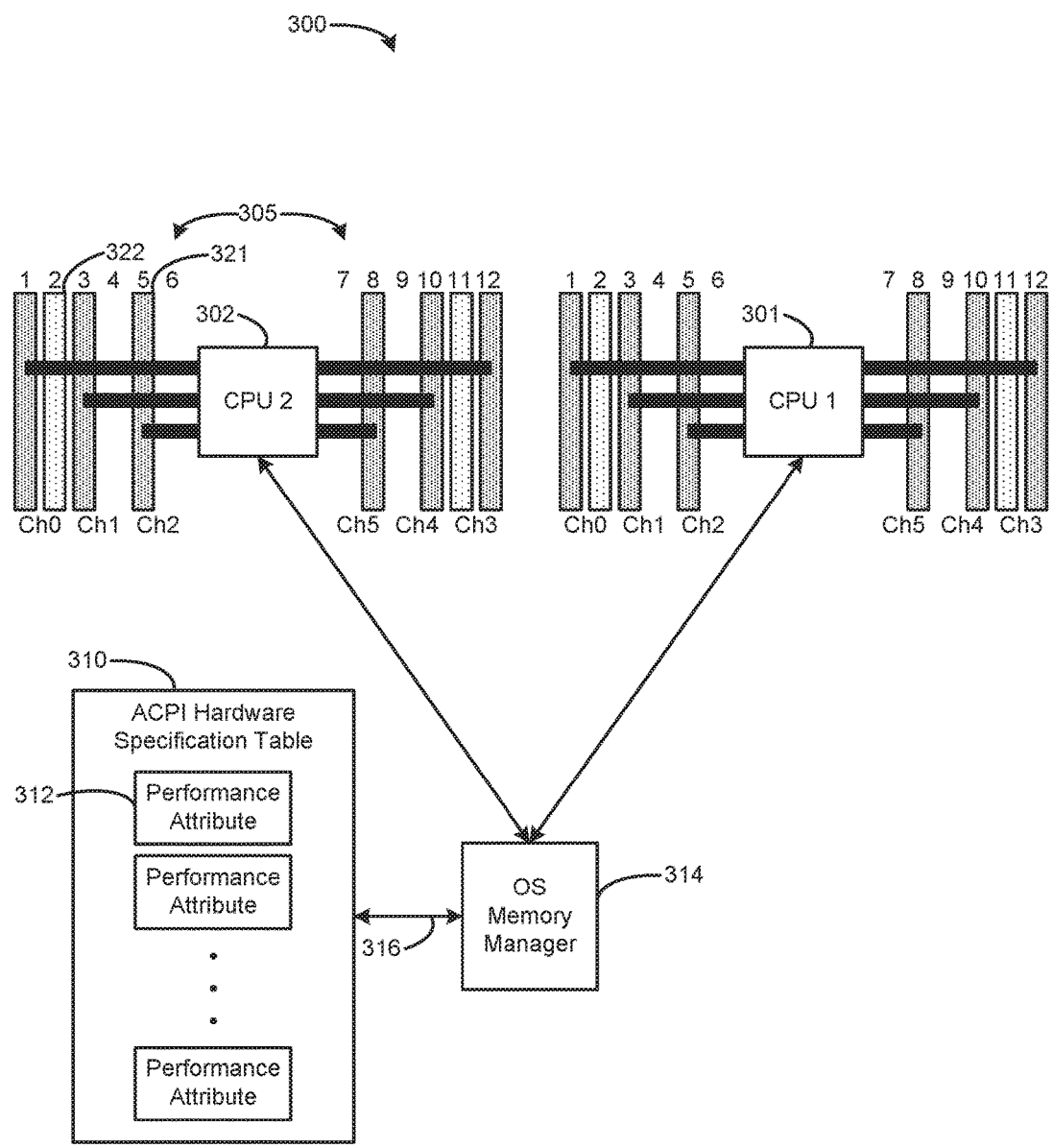
FIG. 3 is a block diagram of a computing system including memory channels associated with different bandwidth performance, and at least one performance attribute according to an example.

FIG. 3 is a block diagram of a computing system 300 including memory channels 305 associated with different bandwidth performance, and at least one performance attribute 312 according to an example. The computing system includes a plurality of CPUs 301, 302, to interact with the memory channels 305. The memory channels 305 of the example implementation of computing system 300 include high bandwidth memory channel 321, and low bandwidth memory channel 322. The OS memory manager 314 interacts with the CPUs 301, 302, and with the ACPI table 310. The ACPI table 310 includes the performance attributes 312, and the OS memory manager 314 is to send and receive notifications 316.

The ACPI hardware specification table 310 (ACPI table) can be provided by updating an existing ACPI table to include new characteristics to accommodate the example performance attributes 312. In alternate examples, the ACPI table 310 can be provided as a new table compatible with ACPI standards, or other such approaches for communicating performance status information.

The notification 316 similarly can be provided as an update to the existing ACPI notification structure, or by using other notification structures (e.g., hot-plug notifications) to communicate updates to the performance attributes 312 to enable the computing system 300 to dynamically respond to changes in memory configuration/operations. The notifications 316 enable the OS memory manager 314 to be alerted to ACPI components, and allows identification of the presence of the ACPI table 310, and to report the performance attributes 312.

The example computing system 300 is shown having memory channels 305 of different bandwidths, e.g., high bandwidth 312 such as a full bandwidth memory channel, and low bandwidth 322 such as a half bandwidth memory channel. Accordingly, the performance attributes 312 can include a bandwidth performance attribute, to express information such as a maximum available bandwidth for a given memory segment, memory channel, populated DIMM configuration, server design topology, or other aspect of the computing system 300. The bandwidth performance attributes 312 therefore enable the OS memory manager 314 to define physical memory pools based on the physical memory bandwidth, server topology information, and/or memory physical regions provided by the bandwidth performance attributes 312 and based on application requests. The bandwidth performance attributes 312 and notifications 316 enable the OS memory manager 314 to select the appropriate physical memory pool, and dynamically tune the virtual memory assignment to physical memory mapping based on memory accessing characteristics defined by the applications' physical memory needs and via the OS's paging and swapping mechanism respecting the applications' workload needs, Thus, over time, the bandwidth performance attributes 312 enable policies for this imbalanced memory configurations (e.g., having varying bandwidth performance across available memory segments and/or memory channels 305) to allocate those processes, having large active data sets in virtual memory, to physical memory locations associated with a high bandwidth 321 performance attribute 312. Similarly, applications having smaller active data sets can be allocated to regions associated with low bandwidth 322 performance attributes 312, for imbalanced memory configurations/topologies as illustrated in FIG. 3. Thus, by applying the bandwidth performance attributes 312, performance implications associated with imbalanced memory configurations can be minimized.

The OS memory manager 314 can identify characteristics of threads/processes that are to make use of the memory, such as the behavior a process based on its application, its data set size, how frequently the process accesses memory, and so on. The OS memory manager 314 can then use the bandwidth performance attributes 312 to intelligently and dynamically allocate the processes to memory by fitting the characteristics of the threads/processes to memory according to the bandwidth performance attributes 312. Thus, the performance attributes 312 provide information to optimize and best fit the nature of the behavior and operation of threads/processes to available (e.g., potentially imbalanced) memory for efficient performance. Such tuning can be performed dynamically, and the OS memory manager 314 can treat the performance attributes 312 as hints regarding consolidation of memory to achieve higher overall memory bandwidth and performance.

In example embodiments, the degree to which performance is prioritized can be customized, e.g., via user preferences, Thus, a user can set a higher priority for power savings, and the OS memory manager 314 can take into consideration whether to place a higher priority on maximizing bandwidth performance by using bandwidth performance attributes 312 to allocate memory, versus using other performance attributes (such as power efficiency), depending on what characteristics a given topology may exhibit (e.g., whether it has one or more imbalances in the memory system that can be optimized for).

Figure 4:
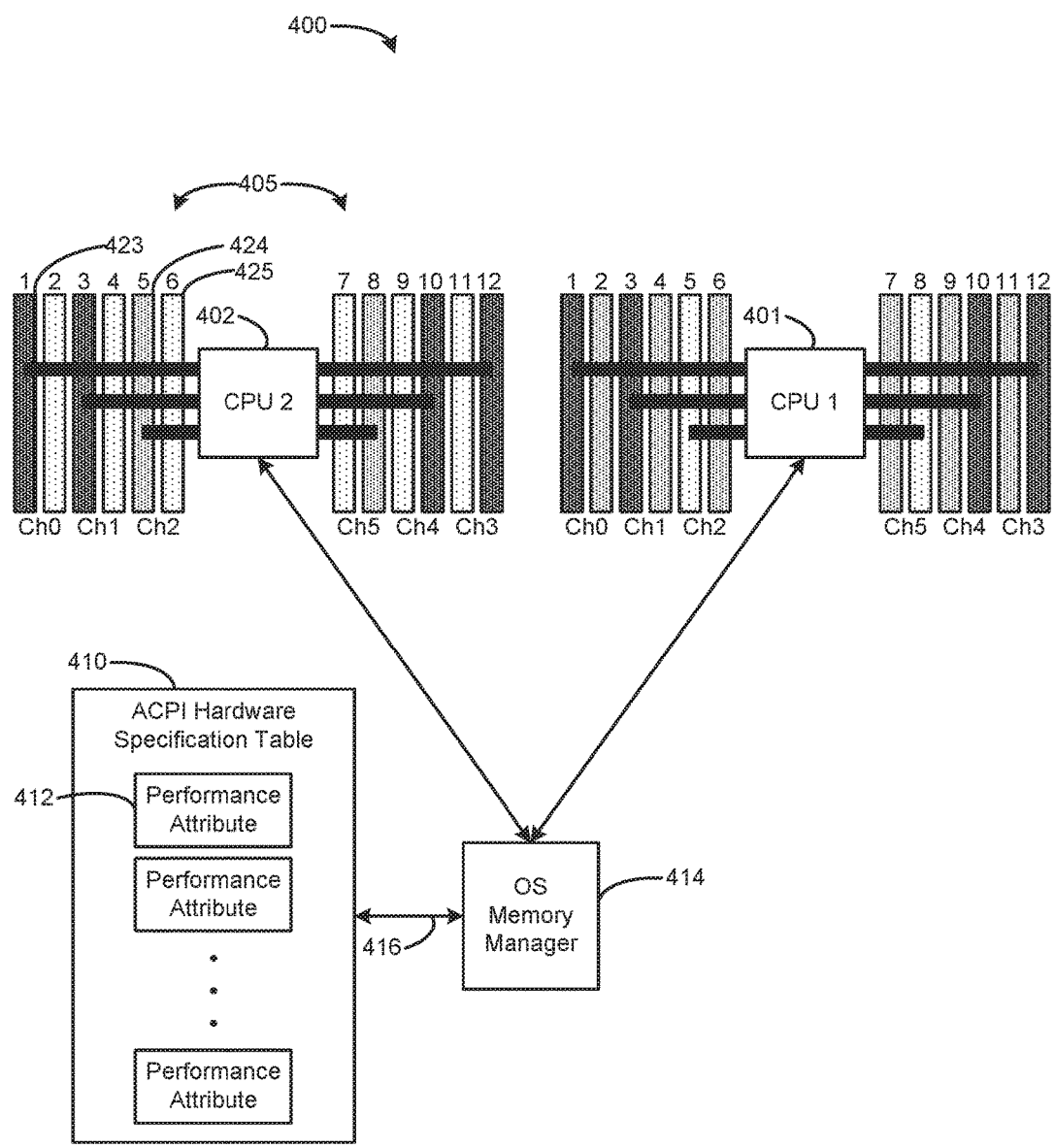
FIG. 4 is a block diagram of a computing system including memory channels associated with different power efficiency performance, and at least one performance attribute according to an example.

FIG. 4 is a block diagram of a computing system 400 including memory channels 405 associated with different power efficiency performance, and at least one performance attribute 412 according to an example. Similar to the example computing system 300 of FIG. 3, the computing system 400 also includes a plurality of CPUs 401, 402, to interact with the memory channels 405. The memory channels 405 include high power (e.g., "hot") memory channel 423, medium power (e.g., "warm") memory channel 424, and low power (e.g., "cold") memory channel 425, The OS memory manager 414 interacts with the CPUs 401, 402, and with the ACPI table 410. The ACPI table 410 includes the performance attributes 412, and the OS memory manager 414 is to send and receive notifications 416, The OS memory manager 414 can use notifications 416 and performance attributes 412 similar to the OS memory manager 314 described above with respect to FIG. 3. Additionally, the performance attributes 412 can represent power efficiency performance attributes. Thus, the OS memory manager 414 (and 314) can perform memory consolidation based on the performance attributes 312, 412. Such power efficiency (and bandwidth) performance attributes 312, 412 can be provided in addition to other attributes such as whether a given memory region is persistent or volatile, enabling additional benefits regardless of whether a given memory region is persistent or volatile.

The OS memory managers 314, 414 also can perform consolidation when the workload in a given memory segment/region is low, rather than performing consolidation randomly within the system memory pool. Accordingly, by focusing in memory segmentation(s) when demand is low, performance is not negatively affected. Furthermore, by consolidating into, e.g., more power efficient memory segments, the remaining segments can go unused and put into a sleep mode to allow the computing system 400 to consume significantly less power. Such power efficiency improvements can be realized by use of the performance attributes 412 regardless of a given physical memory configuration, whether balanced or unbalanced, and whether partially, mostly, or fully populated.

The power efficiency performance attributes 412 enable ordering of physical memory locations that can be utilized, e.g., based on a first-to-allocate and last-to-use approach by the OS memory manager 414 for improved power efficiency (e.g., in a computing system 400 having an imbalanced memory topology regarding memory power efficiency). The power efficiency performance attribute 412 (and/or the bandwidth performance attribute 312) can be assigned (e.g., by system BIOS and/or firmware) to each physical memory region, which can by at a higher granularity than a single memory channel/memory module (e.g., different performance attributes 312/412 can be assigned to different memory segments within a given memory module/for a given memory channel), A given memory segment associated with a memory channel 405 can be designated with a "hot," "warm," or "cold" power efficiency performance attribute 412. The OS memory manager 414 can use the performance attributes 412 to consolidate memory allocation to save power or increase bandwidth, e.g., in the order of the memory classifications. For example, the "hot" region(s) can be allocated first, then "warm," and lastly "cold." Memory allocation or de-allocation sequences can reflect system workload demands, e.g., as requested by running applications, The memory chunk size of these regions can be varied and programmed by applying different memory interleaving schemes to the memory segment(s).

The performance attributes 412 enable additional power savings on top of memory sub-system power management features. The aggressiveness of memory consolidation can be associated with OS power management options, e.g., user selectable and configurable options. Use of a more aggressive policy can yield higher power savings but lower performance. Such tuning can be performed dynamically, and the OS memory manager 414 can treat the performance attributes 312, 412 as a hint for consolidating memory. Thus, when not needed, memory can be consolidated into smaller regions to save power in particular, rather than by randomly allocating memory.

Figure 5:
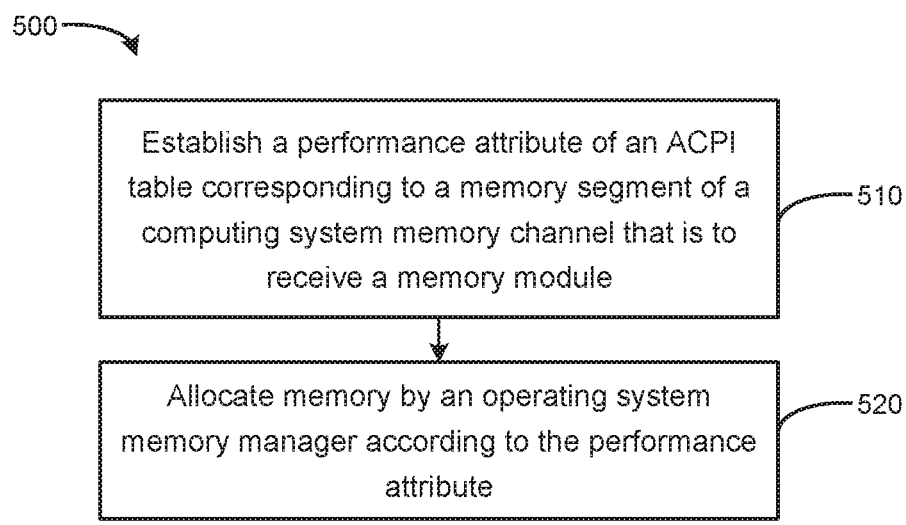
FIG. 5 is a flow chart based on establishing at least one performance attribute according to an example.
Figure 6:
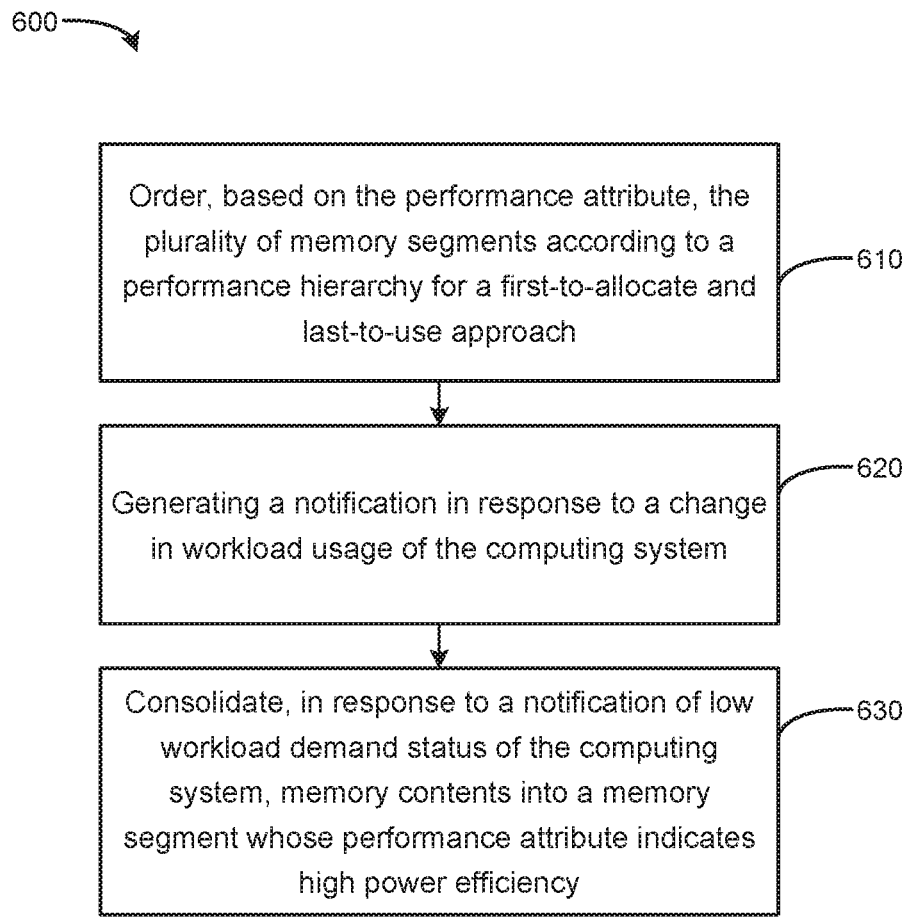
FIG. 6 is a flow chart based on ordering memory segments, generating a notification, and consolidating memory contents according to an example.

Referring to FIGS. 5 and 6, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 5 is a flow chart 600 based on establishing at least one performance attribute according to an example. In block 510, a performance attribute of an Advanced Configuration and Power Interface (ACPI) Hardware Specification table is established. The performance attribute corresponds to at least one of a plurality of memory segments corresponding to at least one memory channel of a computing system that is to receive a memory module. For example, computing system firmware can perform a discovery routine to identify available memory and its associated performance, and populate the ACPI table with corresponding performance attributes to characterize the available memory that is to be allocated. In block 520, memory is allocated by an operating system memory manager according to the performance attribute. The performance attribute can indicate at least one of i) bandwidth performance, and ii) power efficiency. For example, the computing system can be deployed in a power-savings usage scenario, and accordingly prioritize allocating memory to power efficient segments of memory based on the power efficiency performance attribute. During periods of low use, the example computing system can further consolidate memory into the power efficient segments, allowing unused segments to go into a sleep mode. In alternate examples/usage scenarios, the computing system can optimize for performance, based on the bandwidth performance attributes. Such prioritization, whether for bandwidth performance or power efficiency performance, can be user-configurable for a given computing system.

FIG. 6 is a flow chart 600 based on ordering memory segments, generating a notification, and consolidating memory contents according to an example. In block 610, the plurality of memory segments are ordered, based on the performance attribute, according to a performance hierarchy for a first-to-allocate and last-to-use approach. For example, the computing system can use the performance attributes to identify which memory segments are "hot," and prioritize allocation of data to those memory segments first. In block 620, a notification is generated in response to a change in workload usage. For example, the computing system can dynamically monitor for any changes in configuration of memory topology/installation, and update the performance attributes accordingly, to reflect the memory performance at a high degree of granularity. The performance attributes for the memory segments can be rearranged, based on physically adding/removing and/or moving memory modules with respect to the available memory channels of the computing system. Furthermore, in example implementations, the data can be re-allocated in response to changes in application loads/needs placed on the memory, independent of whether the memory topology has physically changed. In block 630, memory contents can be consolidated, in response to a notification of low workload demand status, into at least one memory segment whose corresponding at least one performance attribute that indicates high power efficiency. For example, an OS memory manager can identify that applications have placing the memory in a low usage condition, and consolidate memory contents into those memory segments whose performance attribute is "cold," resulting in power savings not only due to use of more power efficient memory for stored contents, by also by consolidating and allowing any remaining unused memory segments (which may be cold, warm, and/or hot) to enter sleep mode.

Examples provided herein may be implemented in hardware, software, or a combination of both. Example systems can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., including a controller and/or processor of a computing device) can include and/or receive a tangible non-transitory computer-readable medium storing a set of computer-readable instructions (e.g., software, firmware, etc.) to execute the methods described above and below in the claims. For example, a system can execute instructions to direct an allocation engine to allocate memory according to example performance attributes, wherein the engine(s) include any combination of hardware and/or software to execute the instructions described herein. As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A computing system comprising:
 a plurality of memory segments corresponding to at least one memory channel that is to receive a memory module; and
 a non-transitory machine-readable storage medium encoded with instructions executable by the computing system that, when executed, cause the computing system to:
  establish a performance attribute of an Advanced Configuration and Power Interface (ACPI) Hardware Specification table,
   wherein the performance attribute is set to indicate a performance of at least one of the plurality of memory segments, and is usable for memory allocation by an operating system memory manager;
  load the ACPI table into operating system memory, wherein the operating system memory manager performs memory allocation according to the performance attribute in the loaded ACPI table;
  identify a notification issued in response to a change in the performance attribute; and
  in response to the identified notification, reload the ACPI table with the changed performance attribute into the operating system memory, wherein the operating system memory manager re-performs memory allocation according to the changed performance attribute in the reloaded ACPI table.

2. The computing system of claim 1, wherein the performance attribute is to indicate bandwidth performance.

3. The computing system of claim 2, wherein the bandwidth performance is associated with a physical configuration of at least one memory module that is to populate the at least one memory channel.

4. The computing system of claim 1, wherein the performance attribute is to indicate a power efficiency.

5. The computing system of claim 1, wherein the performance attribute is associated with a memory subsystem design topology corresponding to a mechanical form factor of the computing system.

6. The computing system of claim 1, wherein the non-transitory machine-readable storage medium is encoded as firmware instructions of the computing system, wherein the firmware instructions direct the computing system to copy the performance attribute from the ACPI table to a memory usable by an operating system of the computing system.

7. The computing system of claim 1, wherein the performance attribute is provided at a granularity of memory address segmentation within a given memory module that is configurable into different operational modes.

8. A method, comprising:
establishing a performance attribute of an Advanced Configuration and Power Interface (ACPI) Hardware Specification table, wherein the performance attribute corresponds to at least one of a plurality of memory segments corresponding to at least one memory channel of a computing system that is to receive a memory module;
loading the ACPI table into operating system memory;
allocating memory by an operating system memory manager according to the performance attribute, wherein the performance attribute indicates at least one of i) bandwidth performance, and ii) power efficiency;
identifying a notification issued in response to a change in the performance attribute;
in response to the identified notification, reloading the ACPI table with the changed performance attribute into the operating system memory; and
reallocating the memory by the operating system memory manager according to the changed performance attribute in the reloaded ACPI table.

9. The method of claim 8, further comprising:
generating the notification in response to a change in workload usage.

10. The method of claim 8, further comprising:
identifying low workload demand status of the computing system; and
consolidating memory contents into at least one memory segment whose corresponding at least one performance attribute that indicates high power efficiency.

11. The method of claim 8, further comprising defining, based on the performance attribute, at least one physical memory pool assignable to virtual memory according to dynamic tuning and application physical memory needs.

12. The method of claim 8, further comprising ordering, based on the performance attribute, the plurality of memory segments according to a performance hierarchy for a first-to-allocate and last-to-use approach.

13. A non-transitory machine-readable storage medium encoded with instructions executable by a computing system that, when executed, cause the computing system to:
establish a performance attribute of an Advanced Configuration and Power Interface (ACPI) Hardware Specification table, wherein the performance attribute corresponds to at least one of a plurality of memory segments of at least one memory channel of a computing system that is to receive a memory module;
load the ACPI table into operating system memory, wherein an operating system memory manager performs memory allocation according to the performance attribute in the loaded ACPI table;
identify a notification issued in response to a change in the performance attribute; and
in response to the identified notification, reload the ACPI table with the changed performance attribute into the operating system memory, wherein the operating system memory manager re-performs memory allocation according to the changed performance attribute in the reloaded ACPI table.

14. The storage medium of claim 13, wherein the notification is to indicate a change in memory configuration of the computing system.

15. The storage medium of claim 13, wherein the computing system is to generate the notification in response to a change in the ACPI table.

16. The storage medium of claim 15, wherein the change in the ACPI table is based on physical change in the at least one memory module installed in the computing system.

17. The storage medium of claim 15, wherein the change in the ACPI table is based on a segmentation change in the at least one memory module installed in the computing system.

18. The storage medium of claim 17, wherein the segmentation change is contained within a given one of the at least one memory module.

19. The storage medium of claim 15, wherein the change in the ACPI table is based on a change in memory populating the computing system.

* * * * *